(No Model.)

G. CLAUTIER.
Collar Button and Stud.

No. 234,961. Patented Nov. 30, 1880.

Witnesses:
N. C. McArthur
Geo. B. Porter

Inventor:
George Clautier,
per Chas. H. Fowler,
Attorney.

UNITED STATES PATENT OFFICE.

GEORGE CLAUTIER, OF ATTLEBOROUGH, MASSACHUSETTS.

COLLAR BUTTON AND STUD.

SPECIFICATION forming part of Letters Patent No. 234,961, dated November 30, 1880.

Application filed October 13, 1880. (No model.)

*To all whom it may concern:*

Be it known that I, GEORGE CLAUTIER, a citizen of the United States, residing at Attleborough, in the county of Bristol and State of Massachusetts, have invented certain new and useful Improvements in Collar Buttons and Studs; and I do hereby declare that the following is a full, clear, and exact description of the same, reference being had to the annexed drawings, making a part of this specification, and to the letters and figures of reference marked thereon.

Figure 1:
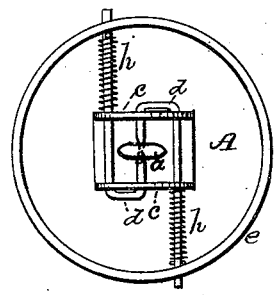
Figure 2:
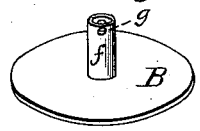
Figure 3:
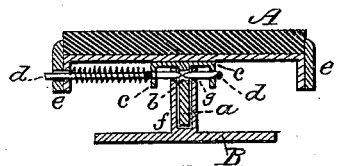
Figure 4:
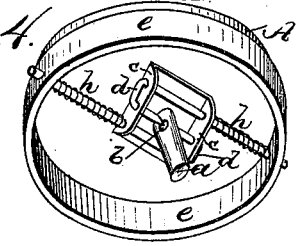

Figure 1 of the drawings is an under-side plan view, on an enlarged scale, of the top button-plate. Fig. 2 is a perspective view of the lower button-plate with tubular shank, and Fig. 3 is a vertical section of the two plates when locked or fastened together. Fig. 4 is an under-side perspective view of the upper section or plate of the button.

The present invention has relation to that class of buttons or studs composed of two sections detachably connected together by a spring-bolt, catch, or other similar fastening; and the object of the invention is to simplify the construction of the fastening employed for connecting and disconnecting the two sections of the button or stud, whereby the fastening is not only easily operated and effective in securely fastening the two sections together, but the article may be manufactured at a comparatively small cost.

These objects I attain by the construction illustrated in the drawings and hereinafter described.

In the accompanying drawings, A B represent, respectively, the upper and lower sections or plates of a button or stud. The upper plate, A, upon its under side, has a central post, $a$, with a hole, $b$, passing horizontally through it; also, upon the under side of said plate A are flanges $c$, one upon each side of the post. These flanges $c$ have each two holes, one of which is on a line with the hole $b$ in the post $a$, upon each side thereof. Passing through these holes in the flanges $c$ are hooked bolts $d$, the long shanks of the bolts passing through holes in the rim $e$ of the plate A, and in a straight line through the holes in the flanges, after which the bolt turns at a right angle and again parallel with the shank, the end of the bolt passing through the hole of the flange which is on a line with the hole in the post, the ends of the bolts meeting through the hole $b$ in the post $a$.

The lower plate, B, has a tubular shank, $f$, for the reception of the post $a$ when the two sections or plates A B are connected together, the shank $f$ having a hole, $g$, through it to register with the hole $b$ in the post.

Coiled springs $h$ are placed around the shanks of the hooked bolts $d$, between the flanges $c$ and rim $e$. The outer ends of the shanks of the bolts $d$ project beyond the rim $e$ of the plate A, and by pressing these shanks in a direction toward the central post, $a$, the hooked ends of the bolts $d$ are caused to be disengaged with the holes $b$ $g$, respectively, in the post $a$ and shank $f$, which will admit the two sections A B being separated. The hooked ends of the bolts $d$ are pointed or beveled, so that when the tubular shank $f$ is placed over the post $a$ and pressed down to place, the ends of the bolts will be forced outward until the hole $g$ of the shank registers or is in line with the hole $b$ of the shank $a$, when the springs $h$ will force the ends of the bolts through the openings, which firmly lock the two plates A B together.

Having now fully described my invention, what I claim as new, and desire to secure by Letters Patent, is—

In a button or stud, the combination, with the plate B, having tubular shank $f$, with hole $g$, of the plate A and post $a$, having hole $b$, the hooked bolts $d$, springs $h$, and flanges $c$, said bolts passing through holes in the flanges and operating to lock the two plates together, as specified.

In testimony that I claim the above I have hereunto subscribed my name in the presence of two witnesses.

GEORGE CLAUTIER.

Witnesses:
GEORGE A. ADAMS,
ELIJAH R. READ.